United States Patent
Walters

(10) Patent No.: US 11,280,114 B2
(45) Date of Patent: Mar. 22, 2022

(54) FRICTION LATCH FOR SLIDING SASH WINDOW

(71) Applicant: Arow Global Corp., Mosinee, WI (US)

(72) Inventor: Joseph Scott Walters, Wild Rose, WI (US)

(73) Assignee: Arow Global Corp., Mosinee, WI (US)

( * ) Notice: Subject to any disclaimer, the term of this patent is extended or adjusted under 35 U.S.C. 154(b) by 769 days.

(21) Appl. No.: 16/148,190

(22) Filed: Oct. 1, 2018

(65) Prior Publication Data

US 2019/0100942 A1 Apr. 4, 2019

Related U.S. Application Data

(60) Provisional application No. 62/565,524, filed on Sep. 29, 2017.

(51) Int. Cl.
| | | |
|---|---|---|
| *E05B 65/08* | (2006.01) | |
| *B60J 1/00* | (2006.01) | |
| *B60J 1/17* | (2006.01) | |

(52) U.S. Cl.
CPC ........... *E05B 65/0841* (2013.01); *B60J 1/006* (2013.01); *B60J 1/17* (2013.01); *E05Y 2900/518* (2013.01); *E05Y 2900/55* (2013.01)

(58) Field of Classification Search
CPC ......... E05B 65/0841; B60J 1/006; B60J 1/17; E05Y 2900/518; E05Y 2900/55
See application file for complete search history.

(56) References Cited

U.S. PATENT DOCUMENTS

| | | | | |
|---|---|---|---|---|
| 3,893,261 | A | * | 7/1975 | Cribben ............... E05B 65/0835 49/449 |
| 5,442,880 | A | | 8/1995 | Gipson |
| 6,014,840 | A | | 1/2000 | Ray et al. |
| 7,025,405 | B2 | * | 4/2006 | Gillen .................... B60J 1/1853 296/146.16 |
| 2005/0087992 | A1 | * | 4/2005 | Romig ................ E05B 65/0858 292/24 |
| 2005/0150171 | A1 | * | 7/2005 | Lahnala ................. B60J 1/1853 49/413 |
| 2005/0210751 | A1 | * | 9/2005 | Kraus ......................... B60J 1/16 49/349 |
| 2006/0107600 | A1 | * | 5/2006 | Nestell ................ E05D 15/0621 49/413 |
| 2006/0260205 | A1 | * | 11/2006 | Dufour .................. B60J 1/1853 49/413 |
| 2007/0056231 | A1 | * | 3/2007 | DiMario .................... B60J 1/10 52/204.53 |

(Continued)

FOREIGN PATENT DOCUMENTS

| | | | | |
|---|---|---|---|---|
| AU | 627346 B2 | * | 8/1992 | ......... E05B 65/0835 |
| EP | 0067075 A1 | * | 12/1982 | ......... E05B 65/0835 |

(Continued)

*Primary Examiner* — Kristina R Fulton
*Assistant Examiner* — Tal Saif
(74) *Attorney, Agent, or Firm* — Harness, Dickey & Pierce, P.L.C.

(57) ABSTRACT

A latch unit for a sliding window mountable within a window frame. A cam portion engages the first side of a retention bar for urging the lip against the resiliency of a spring toward an unlatched configuration in which the flange disengages the frame as the handle is hingedly rotated.

2 Claims, 14 Drawing Sheets

(56) References Cited

U.S. PATENT DOCUMENTS

| | | | |
|---|---|---|---|
| 2007/0157522 A1* | 7/2007 | Hebert | B60J 1/1853 49/413 |
| 2008/0122262 A1* | 5/2008 | Cicala | B60J 10/74 296/201 |
| 2008/0127563 A1* | 6/2008 | Tooker | E05F 15/635 49/349 |
| 2012/0056450 A1* | 3/2012 | DiMario | B60J 1/006 296/224 |

FOREIGN PATENT DOCUMENTS

| | | | | |
|---|---|---|---|---|
| EP | 0341174 A1 * | 11/1989 | | E05B 65/0835 |
| EP | 0908591 A2 * | 4/1999 | | E05B 65/0835 |

* cited by examiner

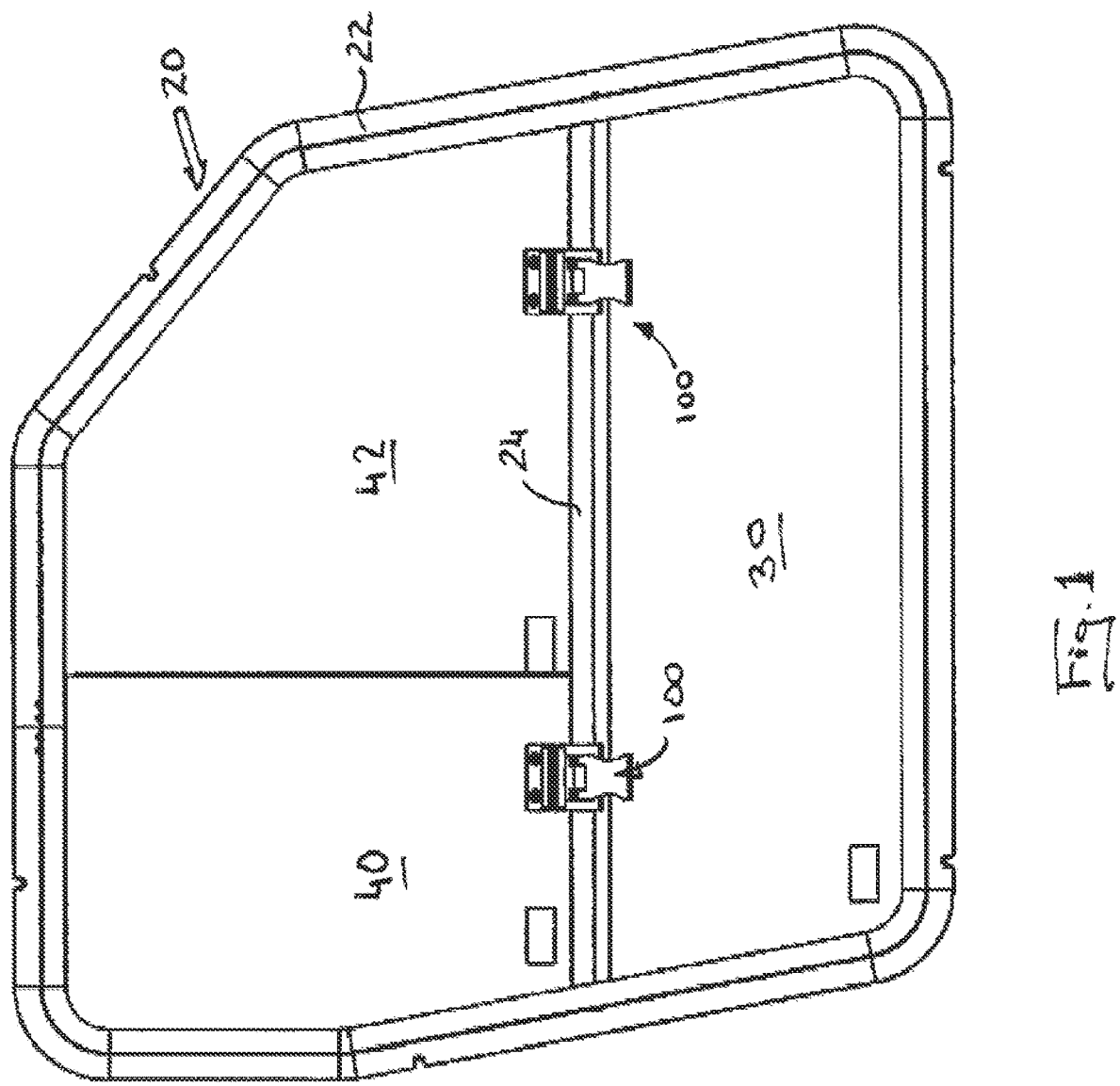

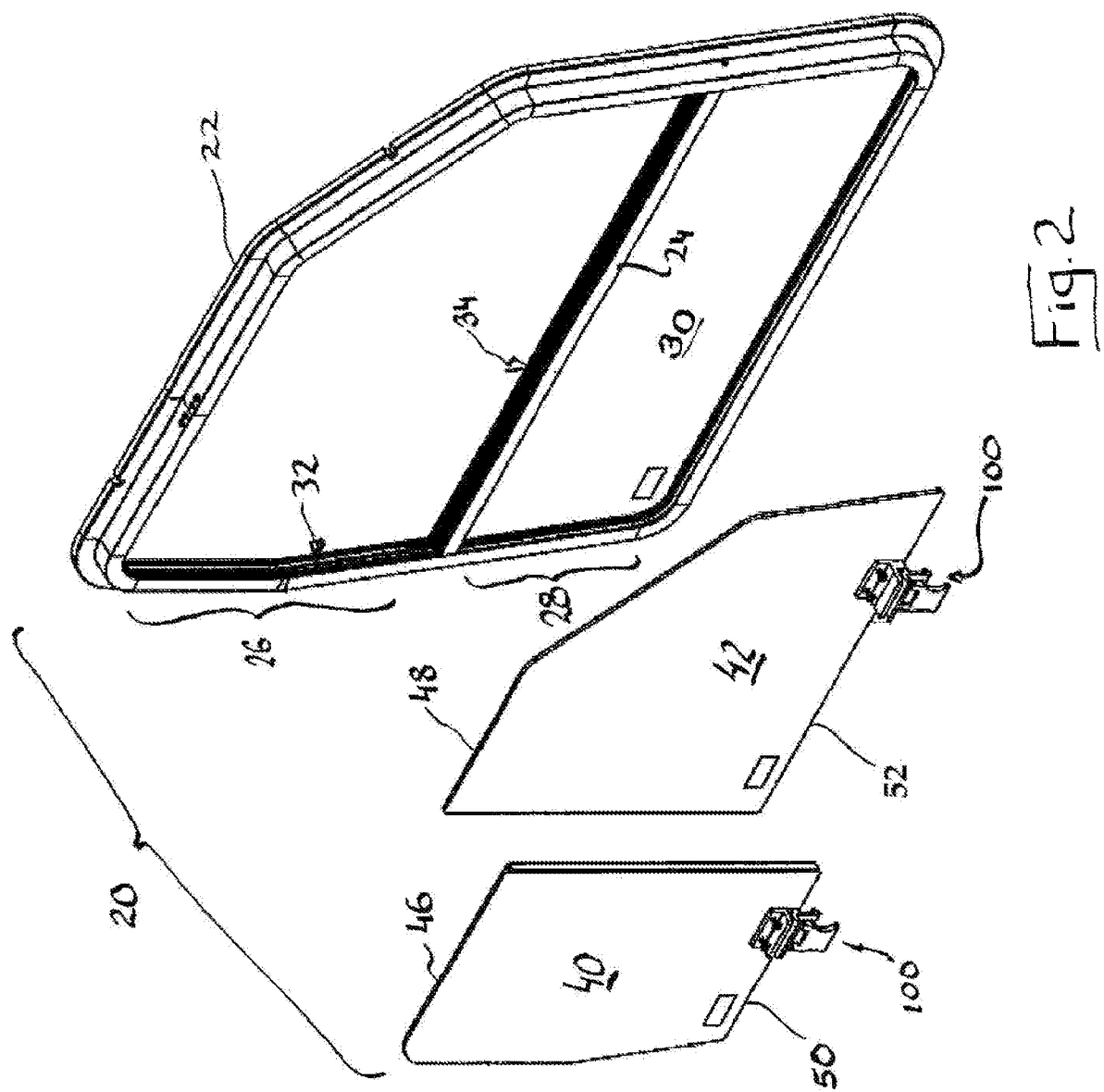

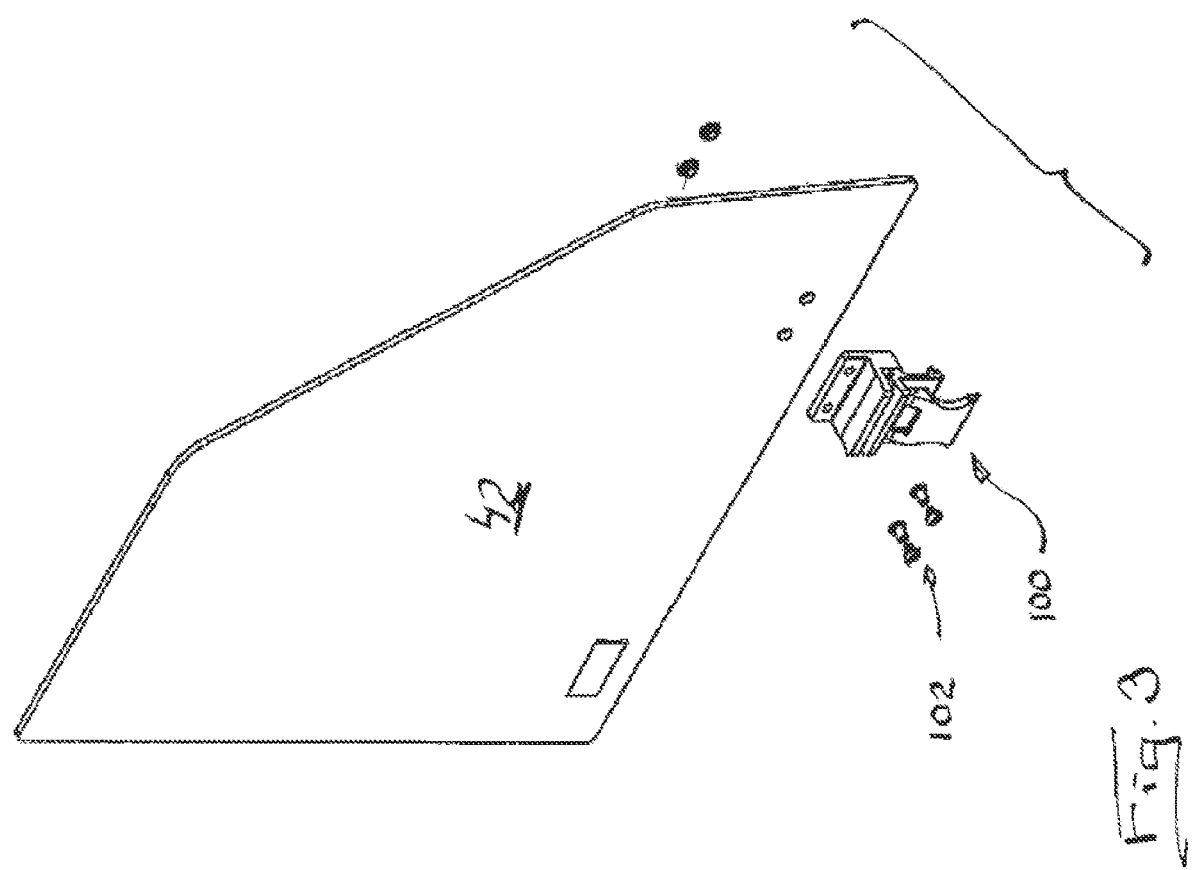

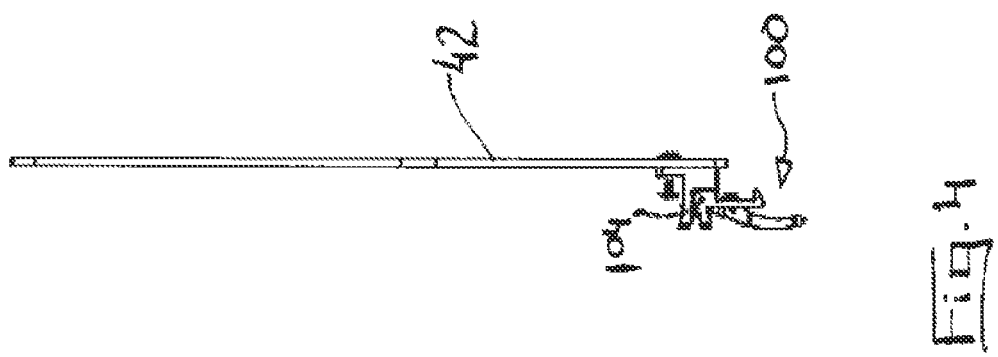

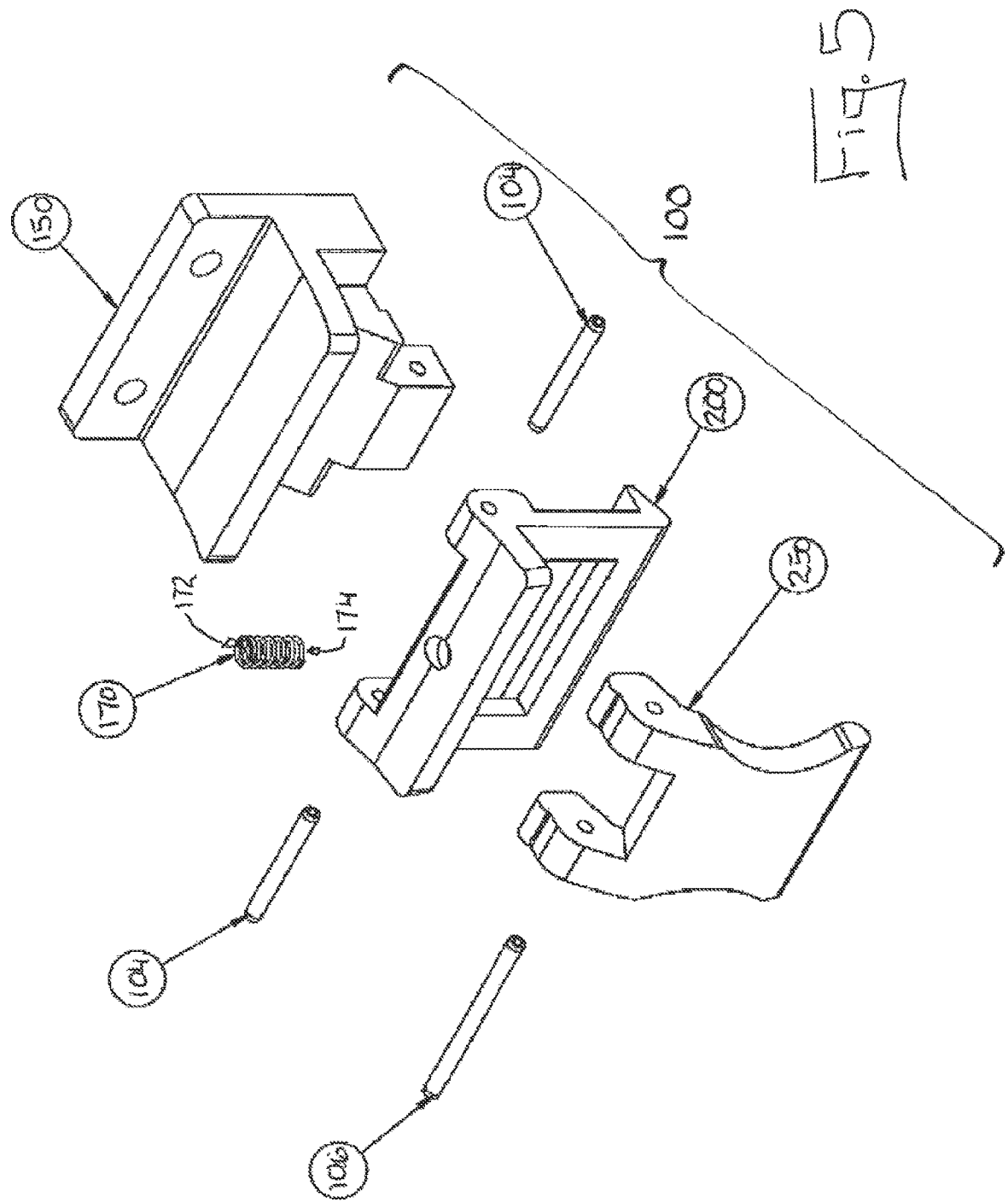

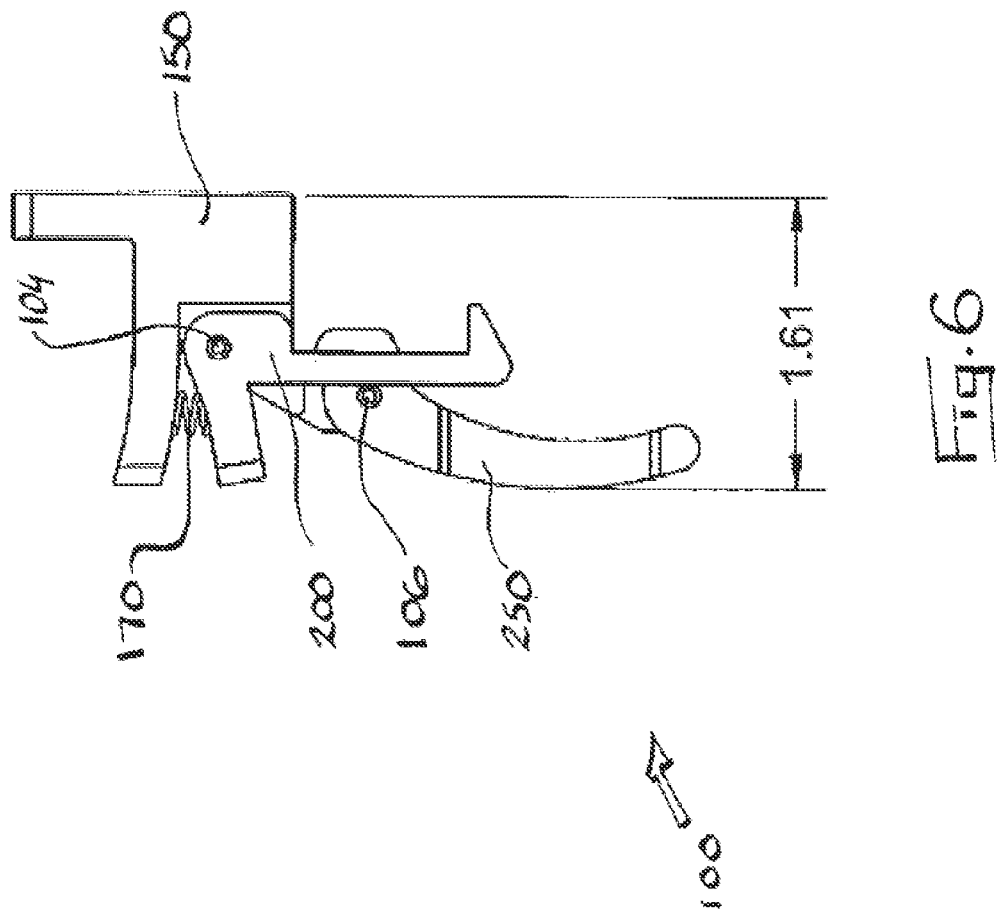

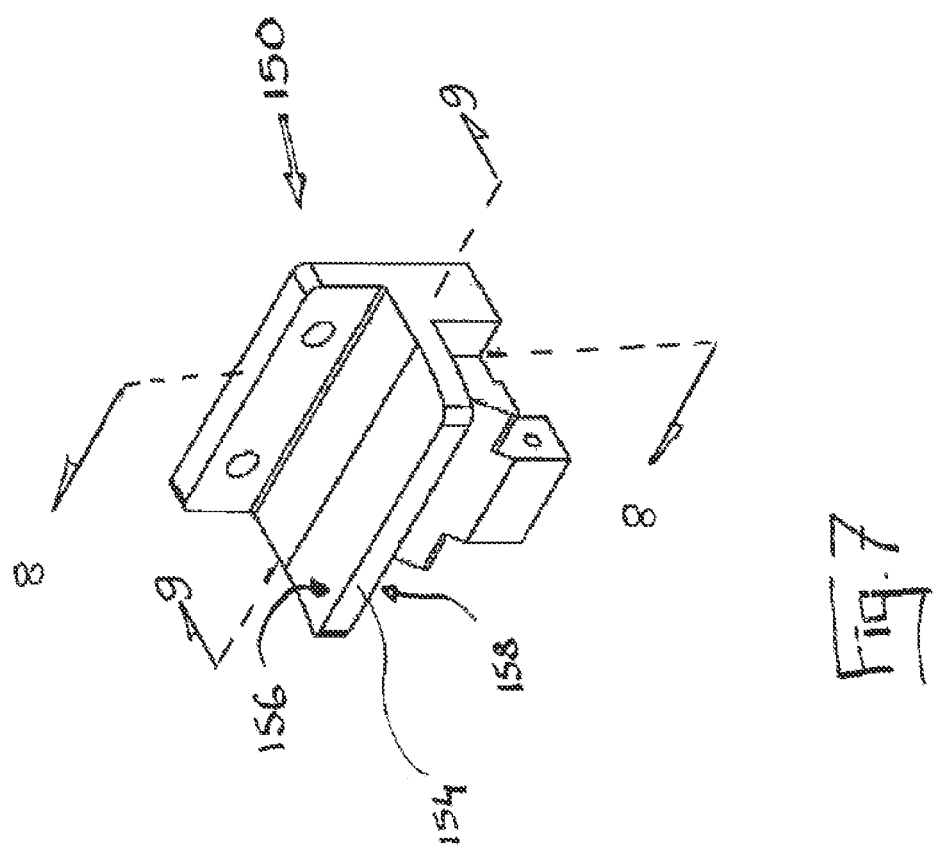

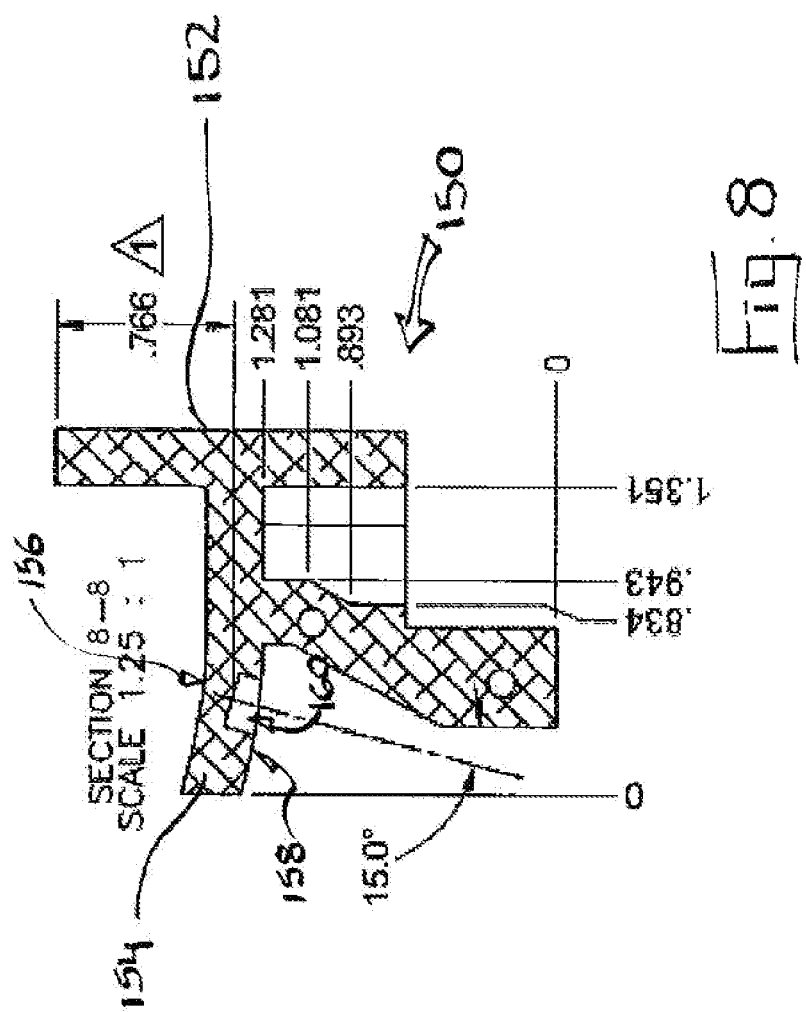

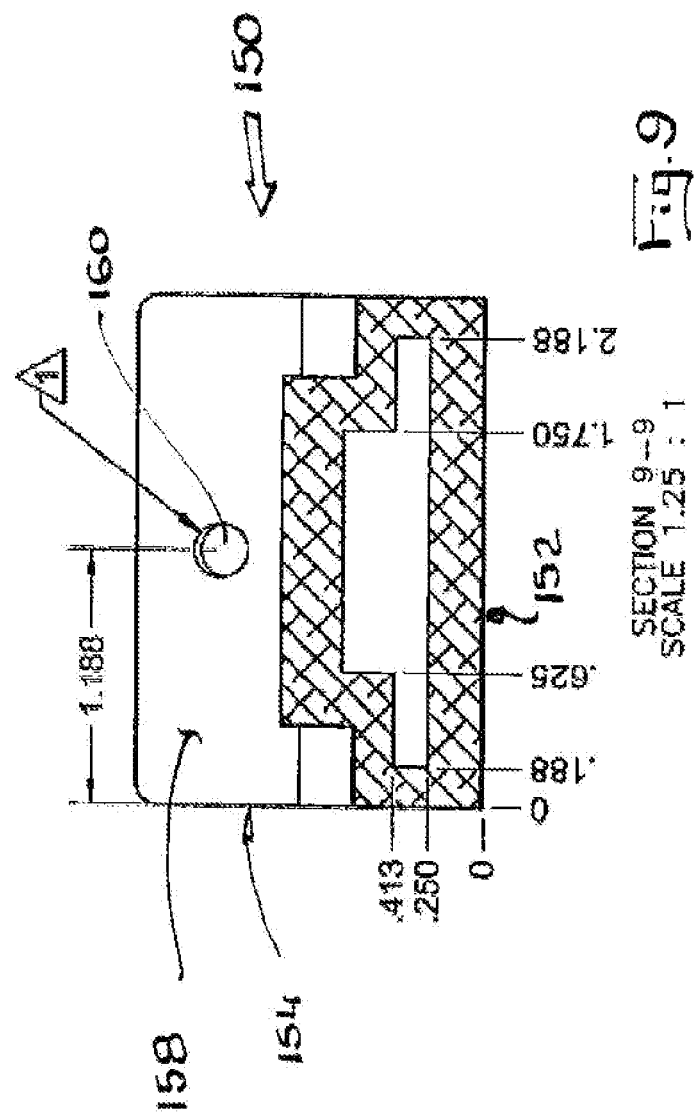

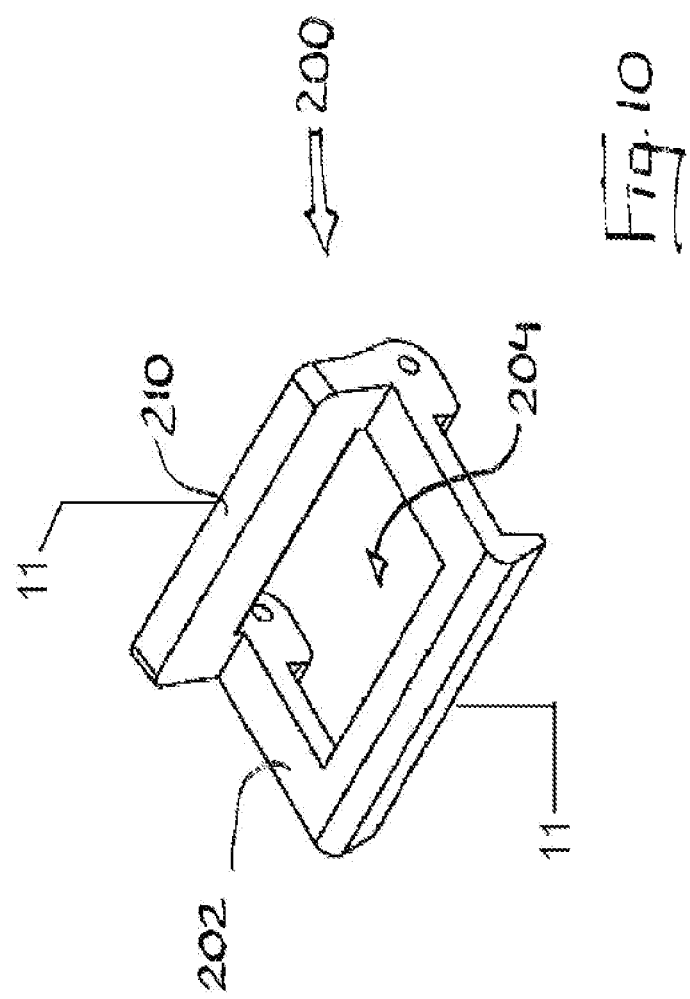

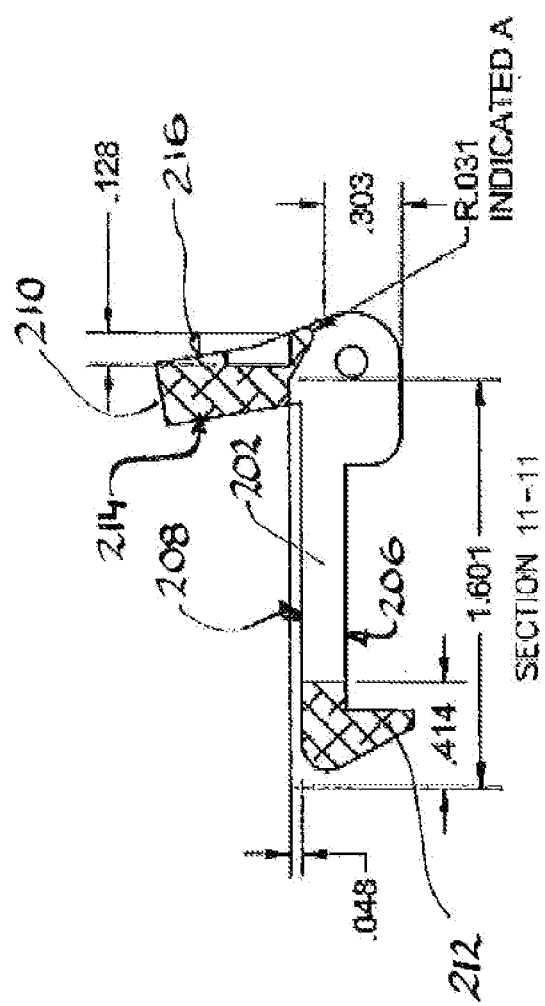

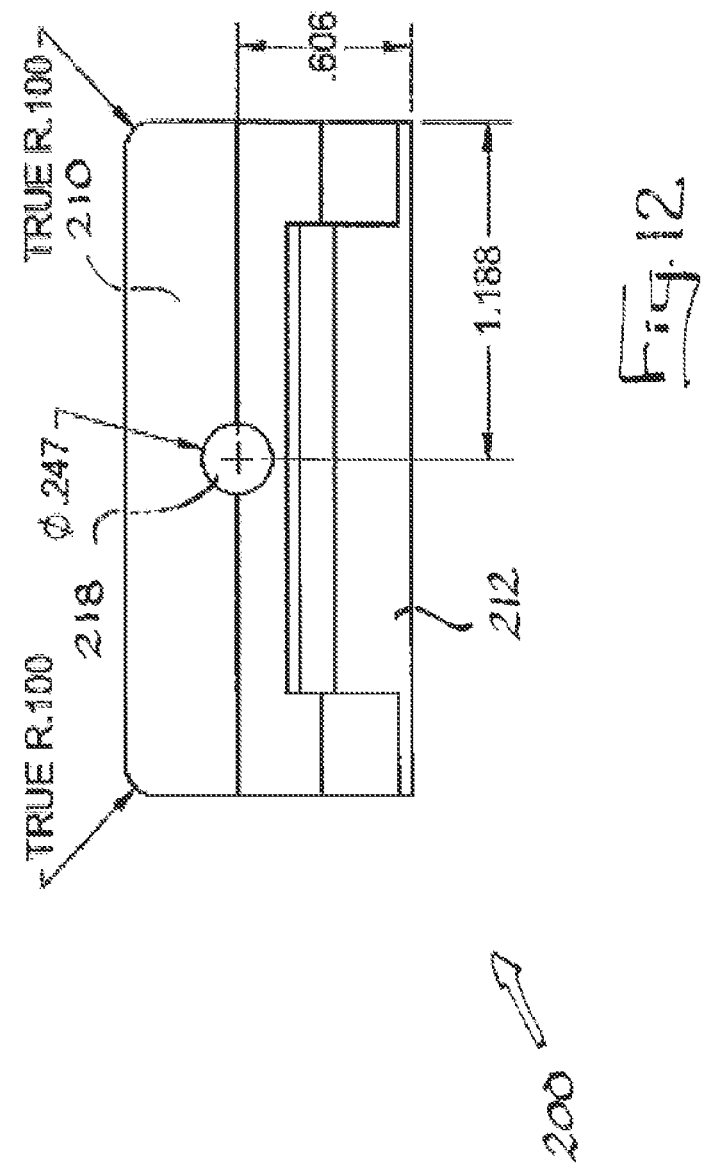

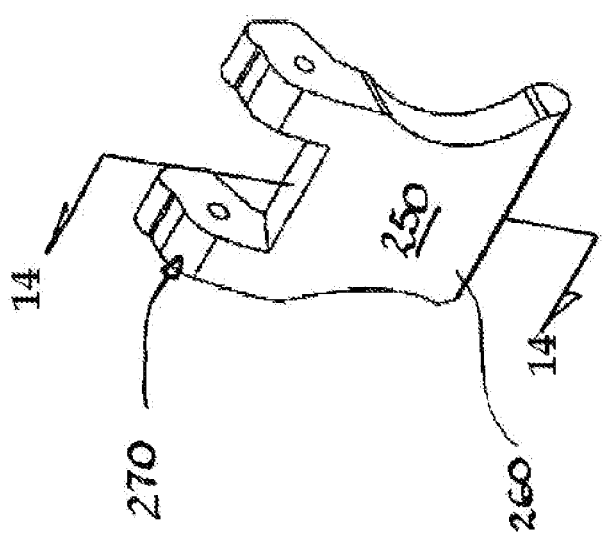

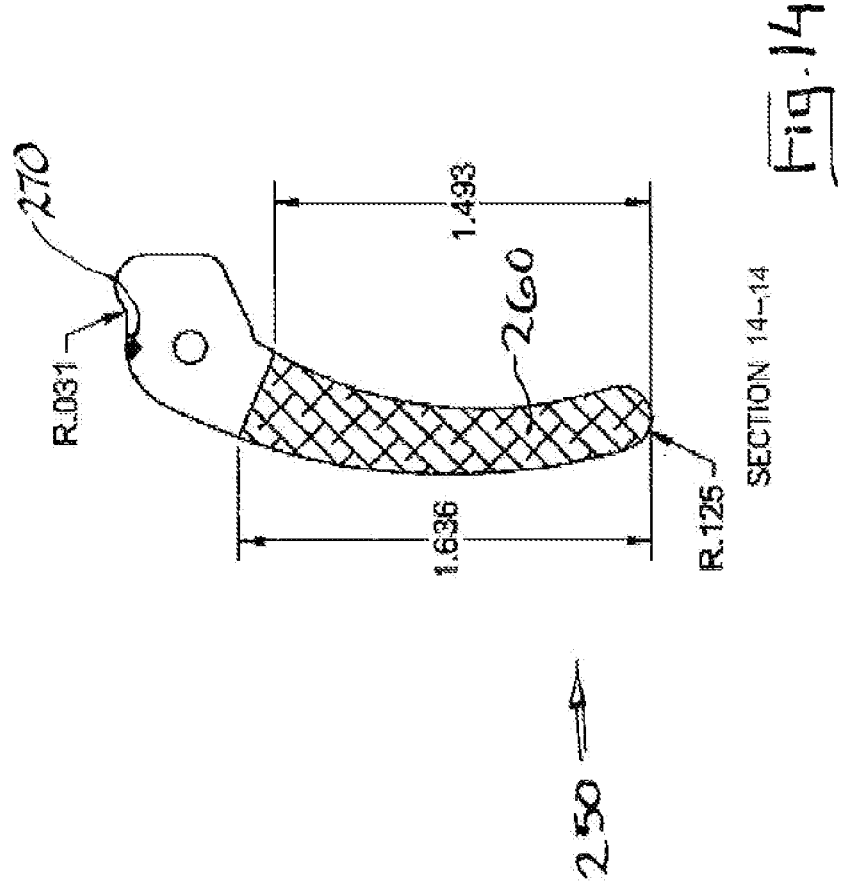

FRICTION LATCH FOR SLIDING SASH WINDOW

CROSS-REFERENCE TO RELATED APPLICATION

This application claims the benefit of U.S. Provisional Application No. 62/565,524, filed on Sep. 29, 2017 The entire disclosure of the above application is incorporated herein by reference.

FIELD OF INVENTION

This invention relates generally to latch assemblies and more particularly, to latch assemblies for sliding windows.

BACKGROUND OF THE INVENTION

There are a variety of latching mechanisms available for sliding windows. Many of the latches act only to keep the window in a closed configuration. Typical examples include the latches described in the following references: EP0067075 B1 ("Paumier"); EP00341174 B1 (Simoncelli"); U.S. Pat. No. 6,014,840 ("Ray et al.") and U.S. Pat. No. 5,442,880 ("Gipson").

In general, the above latch assemblies are not configured to arrest a sliding window between an open configuration and a closed configuration. Furthermore, the above latch assemblies do not retain the sliding windows in a frame nor are they easy to operate while wearing gloves.

SUMMARY OF THE INVENTION

The present invention provides, in general, a locking latch which attaches to a sliding window and can selectively frictionally engage a window frame in which the window is slidably mounted.

More particularly, the invention provides a latch unit for a sliding window mountable within a window frame. The latch unit has a sash base for mounting to the sliding window. The sash base has a back surface for abutting the window and a shelf extending from the back surface. The shelf has a first surface opposite a second surface with provision on the second surface for retaining one end of a resilient element. A retention bar is hingedly connected to the sash base adjacent the second surface of the shelf. The retention bar has a wall with a front opposite a back with a lip extending from the back of the wall and a flange extending from the front of the wall. The lip has a first side opposite a second side with provision in the second side for retaining a second end of the resilient member opposite the first end whereby the resilient member is sandwiched between the sash base and the retention bar to urge the retention bar toward a latched configuration in which the flange engages the frame. A handle is hingedly connected to the sash base adjacent the retention bar. The handle has a gripping portion and a cam portion. The cam portion engages the first side of the retention bar for urging the lip against the resiliency of the spring toward an unlatched configuration in which the flange disengages the frame as the handle is hingedly rotated.

The dimensions of the frame may be selected to provide clearance to enable the sliding window to be lifted out of the frame yet to prevent the window from falling out of the frame.

The locking latch in its unlatched configuration may enable the flange to clear the frame to enable removal of the sliding window from the frame while securing the sliding window against removal in the latched configuration.

DESCRIPTION OF THE DRAWINGS

Preferred embodiments of the invention are described below with reference to the accompanying illustrations in which:

FIG. 1 is a front elevation of a window assembly incorporating a latch unit according to the present invention;

FIG. 2 is an exploded perspective view of the window assembly of FIG. 1;

FIG. 3 is an exploded perspective view showing the latch assembly and a window;

FIG. 4 is an end elevation of the latch assembly attached to the window;

FIG. 5 is an exploded perspective view of the latch assembly;

FIG. 6 is a side elevation of the latch assembly;

FIG. 7 is a perspective view of a sash base component of the latch assembly;

FIG. 8 is a sectional view on line 8-8 of FIG. 7;

FIG. 9 is a sectional view on line 9-9 of FIG. 7;

FIG. 10 is a perspective view of a retention bar component of the latch;

FIG. 11 is a sectional view on line 11-11 of FIG. 10;

FIG. 12 is a top plan view of the retention bar;

FIG. 13 is a perspective view of a handle component of the latch; and,

FIG. 14 is a sectional view on line 14-14 of FIG. 13.

DESCRIPTION OF PREFERRED EMBODIMENTS

A window assembly is generally indicated by reference 20 in FIGS. 1 and 2. The window assembly has a perimeter frame 22 extending thereabout with a frame member 24 extending transversely thereacross.

The perimeter frame 22 defines an inwardly opening generally "U" shaped channel 32. The frame member also defines a generally "U"-shaped channel 34 facing at least an upper part 26 of the perimeter frame. The frame member 24 may have a generally "H"-shaped cross-section to also define a generally "U"-shaped channel facing a lower part 28 of the perimeter frame 22.

A lower panel 30 is mounted in the lower part 28 of the perimeter frame 22 between the perimeter frame 22 and the frame member 24. The lower panel 30 may be received in the channels defined by the perimeter frame 22 and frame member 24 although other mounting arrangements may be used and the channels dispensed with in this area. The lower panel 30 would typically be fixed although it may be removable for replacement.

A front slider sash 40 and rear slider sash 42 are received in the upper part of the frame 22 between the frame 22 and the frame member 24. The front slider sash 40 and rear slider sash 42 overlap at respective adjacent ends and are slidable along the channels in the perimeter frame 22 and frame member 24. Typically, the height of the channels would be selected so as to enable installation of the front slider sash 40 and rear slider sash 42 by: placing a top 46 of the front slider sash 40 and a top 48 of the rear slider sash 42 into the channel 32; urging the front slider sash 40 and rear slider sash 42 into the channel 32 so that a bottom 40 of the front slider sash 50 and a bottom 52 of the rear slider sash may be placed into the channel 34; and lowering the bottom 52 into the channel 34.

The dimensions of the front slider sash 40, rear slider sash 42 and channels 32 and 34 would be selected so that the front slider sash 40 and rear slider sash 42 remain in the channels 32 and 34 while enabling fore and aft movement of the front and rear slider sashes 40 and 42 respectively.

It will be appreciated that the above arrangement on its own will result in the front slider sash 40 and rear slider sash 42 being free to move fore and aft relatively unrestrained accompanied by possible rattles and even the possibility of falling out of the frames 32 and 34 if the window assembly 20 is jostled about as it may be if mounted on construction or agricultural equipment such as vehicles.

In order to removably secure a sliding window such as front slider sash 40 or rear slider sash 42 against the above rattling, falling out or unwanted sliding, a latch unit generally indicated by reference 100 is provided. In very general terms, the latch unit 100 accts as an interface between the frame member 24 and a sliding window such as the front or rear sashes 40 and 42 respectively to removably secure the sliding window to the frame member 24. As shown in FIG. 5, the latch unit 100 comprises a sash base 150 hingedly connected to a retention bar 200 and a handle 250.

The sash base 150 is illustrated on its own in FIGS. 7, 8 and 9. The sash base 150 has a back surface 152 for abutting the window such as the rear slider sash 42. Fasteners 102 may be used to secure the sash base 150 to the window (see FIG. 3).

The sash base 150 has a shelf 154 extending from the back surface 152. The shelf 154 has a first surface 156 opposite a second surface 158. The second surface 158 has a pocket or recess 160 which acts as a provision for retaining a first end 172 of a resilient member such as spring 170 (FIG. 5).

Other provisions than a recess 160 may be provided such as for example a protrusion (not shown) which may be received within an end of the spring 170. Although a spring 170 is currently preferred resilient member, it will be appreciated that another resilient member, such as an elastomeric one, may be used.

The retention bar 200 is hingedly connected to the sash base 150 adjacent the second surface 158 of the shelf 154 with hinge pins 104 as shown in FIGS. 4, 5 and 6. The retention bar 200 is shown on its own in FIGS. 10, 11 and 12.

The retention bar 200 has a wall 202 with an aperture 204 extending therethrough for receiving the handle 250. The wall 202 has a front 206 opposite a back 208 with a lip 210 extending from the back 208. A flange 212 extends from the front 206 of the wall 202 generally opposite in direction to the lip 210.

The lip 210 has a first side 214 opposite a second side 216 A recess or pocket 218 extends into the second side 216 which acts as a provision for retaining a second end 174 of the spring 170. As discussed above with respect to the recess 160, the pocket 218 may be substituted with an alternative provision for retaining the spring 170 such as a protrusion (not shown) which is received in the second end of the spring 170. The spring 170 is sandwiched between the sash base 150 and retention bar 200 in the assembled configuration to urge the retention bar toward a latched configuration shown in FIGS. 1, 4 and 6 in which flange 212 engages the frame member 24.

The handle 250 is hingedly connected via a hinge pin 106 to the sash base 150 adjacent the retention bar 200 (see FIGS. 5 and 6). The handle has a gripping portion 260 and a cam portion 270. The cam portion 270 engages the first side 214 of the retention bar 200 to urge the lip against the resiliency of the spring 170 toward an unlatched configuration in which the flange 212 disengages the frame member 24 as the handle 250 is hingedly rotated. Preferably the gripping portion is large enough for comfortable gripping with a gloved hand.

In the disengaged configuration the windows (i.e. the front slider sash 46 or rear slider sash 48) may be slid fore and aft or lifted out of engagement with the channel 34 in the frame member 24 for removal.

In the engaged configuration, the windows are retained in the channel 34 and secured against fore and aft sliding movement.

The above description is intended in an illustrative rather than a restrictive sense. Variations may be apparent to persons skilled in the art without departing from the scope of the invention as defined by the claims below.

What is claimed is:

1. A locking latch which attaches to a sliding window and can selectively frictionally engage a window frame in which the sliding window is slidably mounted; the locking latch comprising:

a latch unit for a sliding window mountable within a window frame;

the latch unit having a sash base for mounting to the sliding window;

the sash base having a back surface for abutting the sliding window and a shelf extending from the back surface;

the shelf having a first surface opposite a second surface with a retaining provision on the second surface for retaining one end of a resilient element;

a retention bar hingedly connected to the sash base adjacent the second surface of the shelf;

the retention bar having a wall with a front opposite a back with a lip extending from the back of the wall and a flange extending from the front of the wall;

the lip having a first side opposite a second side with provision in the second side for retaining a second end of the resilient element opposite the first end whereby the resilient element is sandwiched between the second surface of the shelf and the second side of the lip to urge the retention bar toward a latched configuration in which the flange engages the window frame;

a handle hingedly connected to the sash base adjacent the retention bar;

the handle having a gripping portion and a cam portion; and the cam portion engaging the first side of the lip for urging the lip against the resiliency of the resilient element toward an unlatched configuration in which the flange disengages the frame as the handle is hingedly rotated.

2. A locking latch according to claim 1 wherein the locking latch in its unlatched configuration enables the flange to clear the window frame to enable removal of the sliding window from the window frame while securing the sliding window against removal in the latched configuration.

* * * * *